United States Patent [19]
Birkestrand et al.

[11] Patent Number: 6,144,125
[45] Date of Patent: Nov. 7, 2000

[54] CONTACTLESS ELECTRONIC CONTROL SYSTEM FOR MODULAR MOTORIZED WHEEL HUB

[75] Inventors: Orville J. Birkestrand, 1435 Jersey Ridge Rd., Davenport, Iowa 52803; Gary Box; Erland Persson, both of Golden Valley, Minn.

[73] Assignee: Orville J. Birkestrand, Davenport, Iowa

[21] Appl. No.: 09/291,703

[22] Filed: Apr. 14, 1999

Related U.S. Application Data

[63] Continuation-in-part of application No. 09/076,317, May 11, 1998.

[51] Int. Cl.$^7$ ............... H02K 11/00; B62K 21/26; B62K 11/00; B62D 61/02
[52] U.S. Cl. ............... 310/68 B; 74/551.9; 180/206; 180/220
[58] Field of Search ............... 310/68 B, 68 A, 310/67 R, 68 R; 323/368, 330, 347, 348; 180/65.2, 65.8, 220, 230, 206, 207; 338/12, 32 R, 32 H; 318/139; 29/16, 45; 74/504, 551.1, 551.9, 543

[56] References Cited

U.S. PATENT DOCUMENTS

| | | | |
|---|---|---|---|
| 3,891,902 | 6/1975 | Konrad | 318/139 |
| 3,921,741 | 11/1975 | Garfinkle et al. | 180/205 |
| 4,191,065 | 3/1980 | Golobay et al. | 74/489 |
| 4,541,500 | 9/1985 | Gelhard | 180/205 |
| 4,600,864 | 7/1986 | Sato | 318/254 |
| 4,878,000 | 10/1989 | Chen | 318/362 |
| 4,914,376 | 4/1990 | Meyer | 323/352 |
| 5,075,605 | 12/1991 | Hendricks et al. | 318/133 |
| 5,086,245 | 2/1992 | Sieja et al. | 310/216 |
| 5,101,924 | 4/1992 | Yamagiwa et al. | 180/220 |
| 5,111,098 | 5/1992 | Peck et al. | 310/268 |
| 5,136,220 | 8/1992 | Philipp | 318/362 |
| 5,146,125 | 9/1992 | Kerlin | 310/68 |
| 5,200,776 | 4/1993 | Sakamoto | 396/86 |
| 5,264,783 | 11/1993 | Vig et al. | 423/294 |
| 5,325,056 | 6/1994 | Shonowaki et al. | 324/207.21 |
| 5,351,027 | 9/1994 | Kawamata et al. | 338/32 |
| 5,406,154 | 4/1995 | Kawaguchi et al. | 310/67 R |
| 5,450,054 | 9/1995 | Schmersal | 338/128 |
| 5,469,033 | 11/1995 | Huang | 318/439 |
| 5,532,561 | 7/1996 | Huang | 318/439 |
| 5,552,988 | 9/1996 | Kawaguchi et al. | 364/426.01 |
| 5,574,364 | 11/1996 | Kajimoto et al. | 324/207.12 |
| 5,598,074 | 1/1997 | Huang | 318/439 |
| 5,675,250 | 10/1997 | Berglund et al. | 324/207.25 |
| 5,677,580 | 10/1997 | Huang | 310/44 |
| 5,788,007 | 8/1998 | Miekka | 180/205 |

*Primary Examiner*—Nestor Ramirez
*Assistant Examiner*—Dang Dingh Le
*Attorney, Agent, or Firm*—Cesari and McKenna, LLP

[57] ABSTRACT

A contactless electronic control system particularly adapted to drive a motorized wheel hub includes a tubular bracket and a tubular grip member encircling the bracket and connected thereto by a rotary connection so that the grip member can rotate about the bracket. A ring magnet having diametrically opposite poles is mounted in the grip member for rotation therewith and a Hall Effect device is mounted to the bracket. When the grip member is rotated in one direction so as to move one of the poles toward the device, the device produces a proportional positive electrical signal and when the grip members rotated relatively in the opposite direction so as to move the other of the poles toward the device, the device produces a proportional negative signal. Preferably, the magnet is positioned between concentric inner and outer pole pieces and the grip member is biased to a home position which locates the magnets poles on opposite sides of the sensor. Preferably also, the control system includes a current source and a control circuit which responds to the proportional voltages produced by the Hall Effect device to develop drive signals suitable for causing a brushless DC motor to operate at various speeds in both the forward and reverse directions.

28 Claims, 5 Drawing Sheets

CONTACTLESS ELECTRONIC CONTROL SYSTEM FOR MODULAR MOTORIZED WHEEL HUB

RELATED APPLICATION

This application is a continuation-in-part of Ser. No. 09/076,317, filed May 11, 1998.

BACKGROUND OF THE INVENTION

This application relates to a contactless electronic control system. It relates especially to a throttle/brake control system for a modular motorized wheel assembly.

There are numerous vehicles in use today which have battery-powered electric motors to drive the wheels of the vehicle. These include bicycles, adult tricycles, wheelchairs, motor scooters, golf carts, all terrain vehicles, etc. In many such vehicles, the electric motor is mounted to the vehicle frame with the motor output being coupled to the wheels by way of a chain drive, gear train or the like. More preferably, the motor is incorporated right into the wheel hub thereby minimizing the size, weight, complexity and cost of the drive system. Examples of such in-hub motors are disclosed in U.S. Pat. Nos. 572,036; 2,514,460 and 3,921,741.

A particularly desirable, modular motorized wheel hub assembly for vehicles of this type is disclosed in pending application Ser. No. 09/076,317, May 11, 1998, the contents of which is hereby incorporated herein by reference.

With modular motorized wheels of the type of interest here, it is essential that suitable control means be provided that are capable of applying the appropriate control voltages to the wheel motor to enable the wheel motor to operate in a reliable fashion. Invariably, such control means include a throttle or throttle/brake control which the vehicle operator may manipulate to accelerate the decelerate the associated vehicle. For the most part, conventional electric motor controllers, particularly those used to control electric bicycles, golf carts and other electric vehicles operate satisfactorily. However, they do have certain disadvantages which limit their wider use and application. More particularly, some such controllers are complex and costly. Others require a large number of moving, contacting parts which are prone to wear thereby limiting the useful life of the controller. Others are not suitable for all weather outdoor applications, such as required on bicycles.

There do exist electromagnetic motor controllers which incorporate Hall Effect devices; see e.g., U.S. Pat. No. 5,450,054. However, those prior controllers require many such devices in order to operate properly. Therefore, they are needlessly expensive and hence impractical for use on electric bikes and other such small vehicles.

Also, those prior controls employing Hall Effect devices are not adequately shielded so that they may be affected by nearby magnetic and ferro-magnetic objects. That is, in response to those objects, the controller may develop spurious signals which can cause the associated motor to spontaneously accelerate or decelerate. Nor do they have a natural, stable zero magnetic field position; i.e., a natural neutral throttle position. Needless to say, these factors can place the vehicle rider in serious danger.

SUMMARY OF THE INVENTION

Accordingly, it is an object of the present invention to provide an all weather, contactless electronic control system that is particularly suitable for controlling a motorized wheel hub.

Another object is to provide a system of this type which is rugged and reliable and is capable of operating outdoors in extreme weather conditions for a prolonged period.

A further object of the invention is to provide a hand-operated control for a motorized vehicle which is relatively easy and inexpensive to make and to assemble.

Still another object of the invention is to provide such a control which is relatively immune to outside magnetic and electrical influences.

Another object of the invention is to provide a control incorporating a rotary member and which produces positive and negative control signals proportional to the angular deviation of that member from a natural home position and which can be used to control a variety of electrical loads.

A further object of the invention is to provide a reliable, long lasting variable voltage control none of whose electrical parts or conductors are rotated or otherwise moved in space.

Another object of this invention is to provide a reliable control for a "brushless" motor with a minimum of necessary wires connected to the motor.

Another object is to provide a safe control system for a motorized vehicle that cannot possibly activate the associated motor until the vehicle is moving and preferably in some applications, only when the operator is pedaling.

A further object of the invention is to provide a control system which is sufficiently small, lightweight and compact to fit on a bicycle or other small vehicle.

An additional object is to provide a control circuit for interfacing a hand or foot-operated rotary control to a brushless DC motor which circuit provides suitable control voltages to enable the motor to operate at varying speeds in both forward and reverse directions as determined by the position of the rotary control.

A further object is to provide a control for a battery-powered motorized vehicle which can sense when the battery is nearing depletion and thereupon limit current to the motor, thereby extending the vehicle's range.

Yet another object of the invention is to provide a control system which may have a cruise control feature.

An additional object is to provide such a control system which can easily be programmed to meet the regulatory requirements of different locales with regard to operating conditions such as top speed, maximum power, minimum braking, pedaling sensing options and the like.

Another object is to provide a control system for a motorized vehicle with regenerative braking which automatically shuts off power to the motor when the braking function is operative.

Still another object is to provide a motor hand control that can be mounted to standard bicycle handle bars without modifying the bicycle.

A further object is to provide a battery/controller unit that can be mounted to a standard bicycle frame without modifying the frame to enable the bicycle to operate under power.

Other objects will, in part, be obvious and will, in part, appear hereinafter.

The invention accordingly comprises the features of constructions, combination of elements and arrangement of parts which will be exemplified in the following detailed description, and the scope of the invention will be indicated in the claims.

Briefly, our contactless control system comprises an electrical device, such as a Hall Effect device, which produces positive and negative electrical signals when exposed to a magnetic field having north and south poles, and magnetic means for producing such a field. The device and the magnetic means are mounted for relative movement so that when one of the poles is moved toward the device (or vice versa), the device produces proportional positive electrical signals and when the other pole is moved toward the device (or vice versa), the device produces proportional negative electrical signals.

Preferably, the magnetic means includes concentric tubular inner and outer pole pieces and a magnet having diametrically opposite poles positioned between the pole pieces so as to confine the magnetic field to the region between the pole pieces where the electrical device is located.

In a preferred embodiment of the invention particularly suitable for mounting to the handlebars of a bicycle, the electrical device is fixed to one of the pole pieces and the magnet is fixed to the other pole piece so that rotation of the pole pieces relatively about their common axis in one direction or the other will rotate the magnetic field to cause the electrical device to produce the aforesaid electrical signals.

It should be understood, however, that in some applications it may be desirable to fix the positions of the pole pieces and allow rotation of the magnet relative to the electrical device, or vice versa. It is also feasible to fix the positions of the magnet and the electrical device and allow for rotation of at least one of the pole pieces which may be shaped to produce magnetic poles which may be rotated toward and away from the electrical device to develop the aforesaid proportional positive and negative electrical signals.

In any event, in the preferred embodiment of the invention, the objective is to produce a diametrically polarized magnetic field which can be rotated relative to the electrical device to either side of a home position so that the device produces proportional positive and negative electrical signals. As we shall see, these signals are applied to a special control circuit to be described in detail later that produces drive signals for a motorized wheel hub mounted to a bicycle so as to selectively propel and brake the bicycle at various rates depending upon the relative position of the magnetic field poles and the electrical device. Power for the control system is provided by rechargeable batteries which, along with the aforesaid control circuit, comprise a compact power unit which may be mounted to the frame of a bicycle without requiring any modification to that frame.

BRIEF DESCRIPTION OF THE DRAWINGS

For a fuller understanding of the nature and objects of the invention, refer to the following detailed description taken in connection with the accompanying drawings, in which.

DETAILED DESCRIPTION OF AN ILLUSTRATIVE EMBODIMENT

Figure 1:
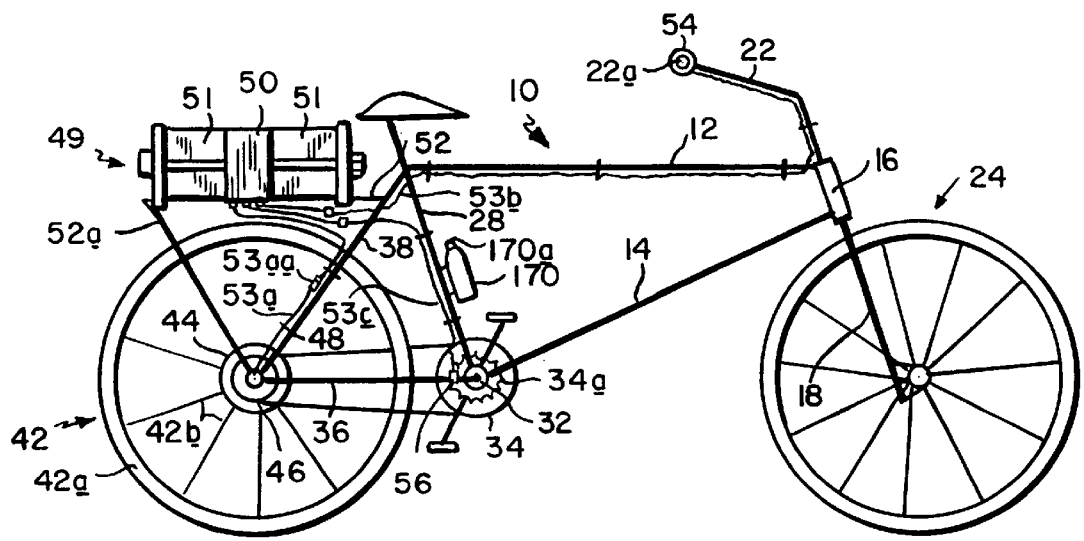
FIG. 1 is a diagrammatic view of a bicycle incorporating my control system for controlling the bicycle's motorized wheel hub.

Refer to FIG. 1 of the drawings which shows a bicycle which includes a more or less standard frame 10 with upper and lower reach bars 12 and 14, a head post 16 mounted to the forward ends of the reach bars, a front fork 18 rotatably mounted to head post 16, the front fork being rotated by handlebars 22. A front wheel 24 is rotatably mounted between the tines of the front fork 18.

The upper and lower reach bars 12 and 14 extend back to a seat post 28, with the lower end of the seat post and the lower reach bar joining at a sprocket tube 32 which rotatably supports a plural-gear pedal sprocket 34. Extending rearwardly from the sprocket tube 32 is a rear fork 36 which, along with a bifurcated rear brace 38 rotatably supports a rear wheel 42. Wheel 42 includes a rim 42a and spokes 42b which extend to a motorized hub assembly 44 mounted to the rear end of rear fork 36. In the bicycle depicted in FIG. 1, the hub assembly 44 includes a one-way, ratchet-driven, free-wheeling rear sprocket 46 which is connected by a chain 48 to the plural-gear pedal sprocket 34. Assembly 44 is preferably the type described in the above-identified pending application.

A power unit 49 comprising an electronic controller 50 sandwiched between a pair of batteries 51 is supported on a rack 52 extending rearwardly from seat post 28 over the rear wheel 42. That rack may be braced by a pair of struts 52a extending down to opposite ends of the rear axle of the bicycle. Controller 50 is connected by a 5-wire electrical power cable 53a to hub assembly 44 or to a battery recharger as will be described later, and via a 5-wire signal cable 53b to a combination electronic throttle/brake control 54 mounted near the hand grip 22a of one of the handlebars 22 and to be described in more detail presently. Control 54 may be actuated in a throttle mode to cause the controller 50 to drive hub assembly 44 so the vehicle is propelled in the forward direction or the control may be actuated in a braking mode to cause the controller to control hub assembly 44 so that the assembly 44 functions as a regenerative brake for slowing or stopping the bicycle.

Thus, the bicycle in FIG. 1 can be powered by the rider pedaling on crank 34 assisted or not by the motorized rear wheel hub assembly 44. The details of that assembly 44 are described in the above-identified pending application. Suffice it to say here that the hub assembly incorporates a modular, brushless, sensorless, 8-pole, 18 slot, 3 phase electric motor 44a (FIG. 7) which can rotate rear wheel 42 so as to either accelerate or decelerate the bicycle, in conjunction with the pedal chain drive.

The purpose of the control system specifically described herein is to control the acceleration and braking of the FIG. 1 bicycle with an eye to local regulations. For example, in some locales, it is required by ordinance that the motor cannot be powered until and unless the rider is continuously pedaling the bicycle. To facilitate such control, the control system incorporates a pedal sensor 56, preferably in the form of a Hall Effect sensor, which is supported opposite one of the gears 34a of the plural-gear pedal sprocket 34. For example, the sensor 56 may be mounted to rear fork 36 or incorporated into the bracket of a kick-stand (not shown) mounted to that fork. When the pedal sprocket is rotated, sensor 56 senses the passage of each tooth of gear 34a and emits corresponding signals via a 3-wire electrical cable 53c to the controller 50. Those signals, along with the signals from the throttle/brake control 54 on cable 53b and the signals from the motorized hub assembly 44 on cable 53a enable controller 50 to properly control the operation of the bicycle as will be described. A unique characteristic of this sensorless motor and its electronic controller is that it requires the mass of the rider and vehicle interacting with the controller in order to continuously power the motor making it practically impossible for this vehicle to take off on its own.

Refer now to FIGS. 2 to 5 which show my throttle/brake control 54 in greater detail. It comprises a bearing element 62 in the form of a bushing which fits snugly around one of the handlebars 22 adjacent to the hand grip 22a for that handlebar. The bearing element 62 has a radial flange 62a which faces away from grip 22a and preferably the bearing element is made of a self-lubricating plastic material such as polyethylene. Encircling handlebar 22 adjacent to the bearing element flange 62a is a sensor bracket 64 also in the form of a bushing with a relatively large radial flange 64a at the end of the bracket remote from bearing element 62. Preferably, the bracket is of a strong, dielectric material such as nylon. Bracket 64 has a longitudinal passage 66 which is more or less the same diameter as the handlebar 22 so that the bracket fits snugly on the handlebar. The end of passage 66 facing the bearing element 62 is counterbored at 66a to accept an inner pole piece 68 in the form of a ring. The pole piece is made of a suitable ferro-magnetic material such as No. 1018 low carbon cold rolled steel (a.k.a. CRS).

Figure 2:
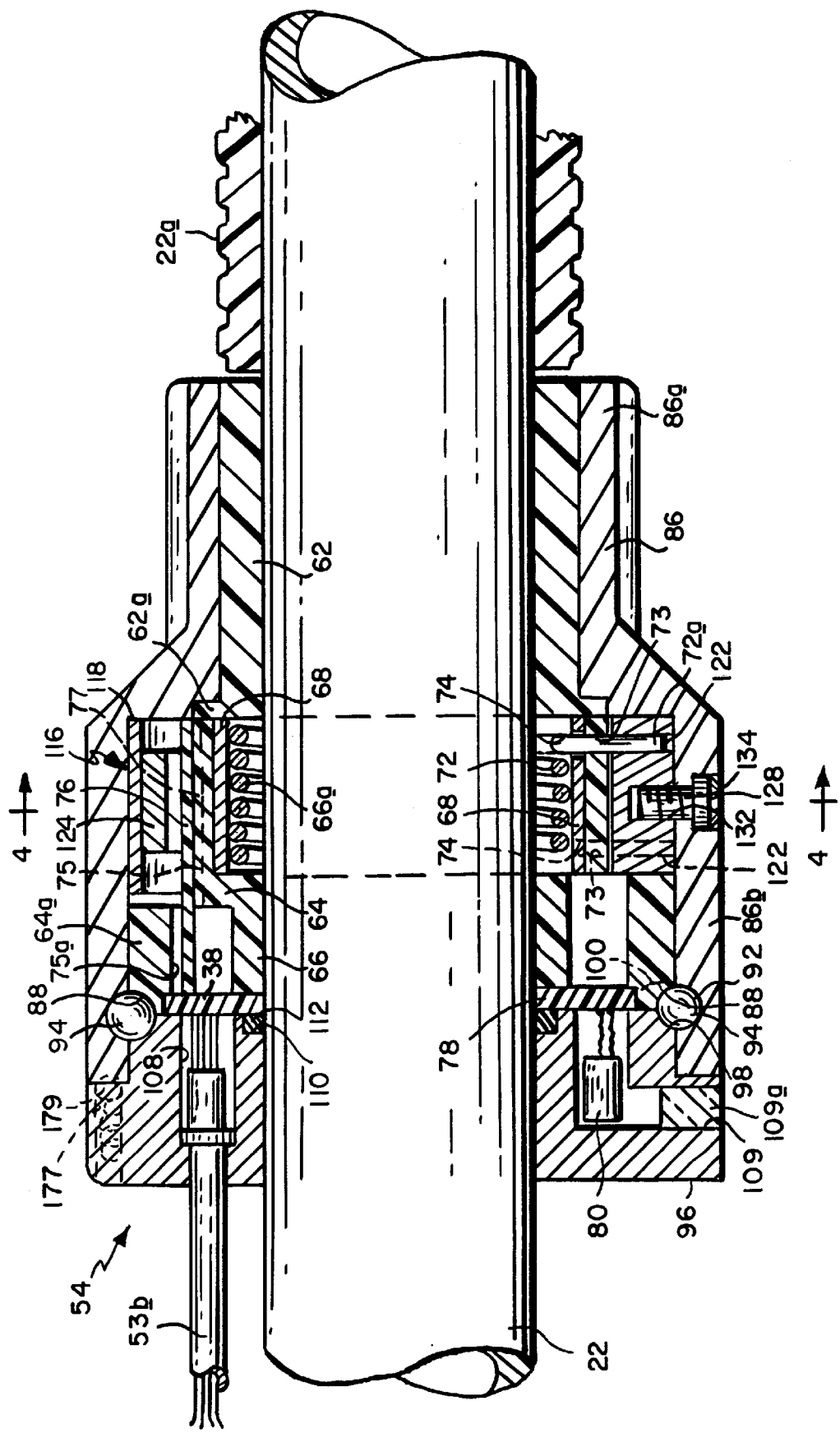
FIG. 2 is a longitudinal sectional view on a much larger scale showing the throttle/brake control of the FIG. 1 system.
Figure 4:
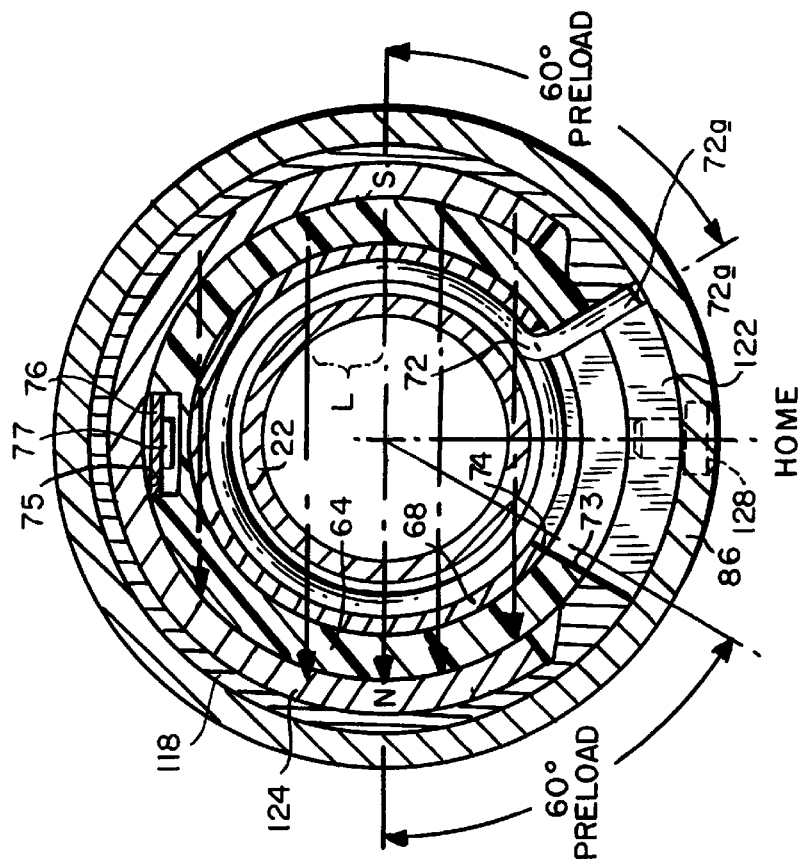
FIG. 4 is a sectional view taken along line 4—4 of FIG. 2.
Figure 5:
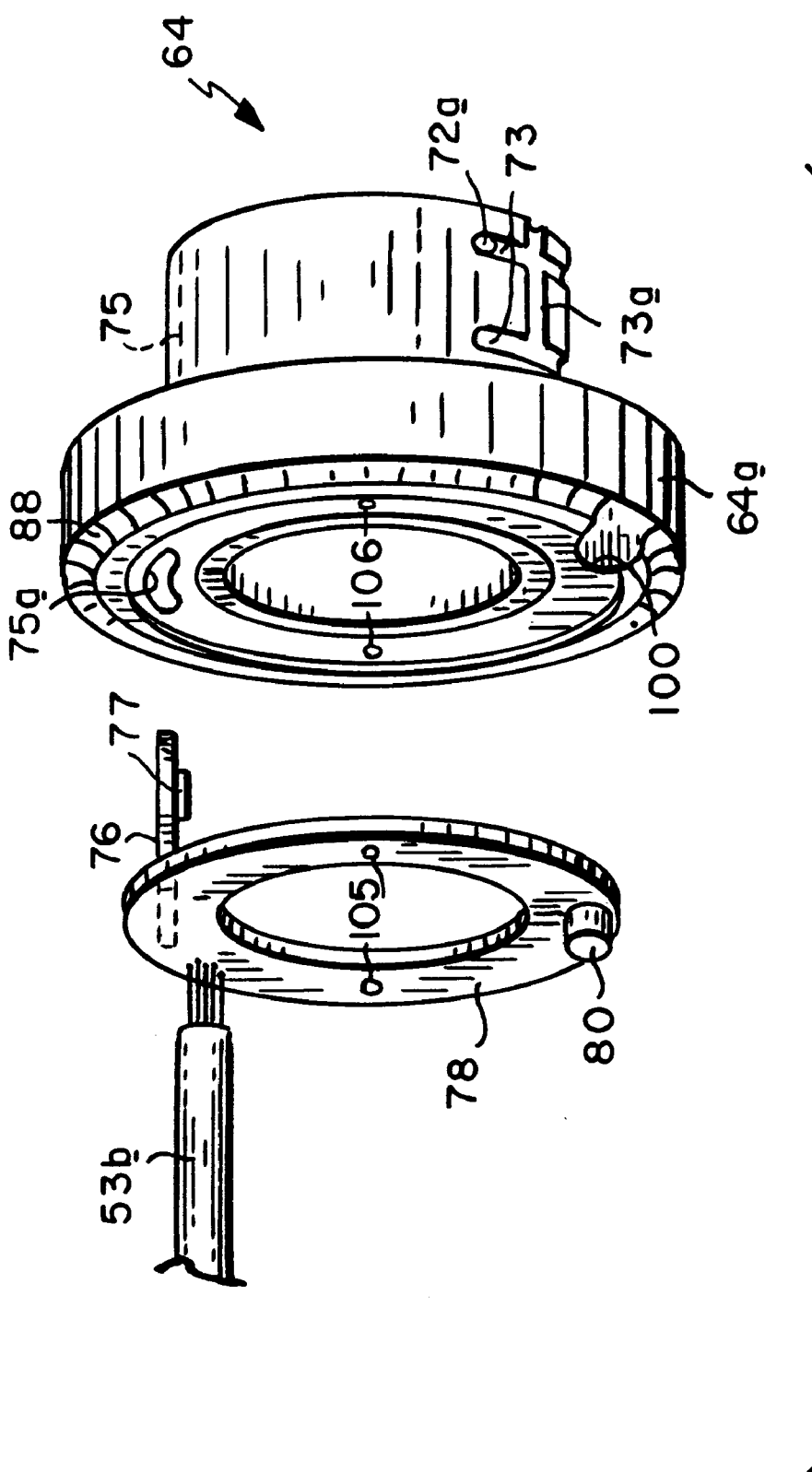
FIG. 5 is an exploded isometric view showing portions of the FIG. 2 control in greater detail.

As shown in FIGS. 2, 4 and 5, a coil torsion spring 72 is positioned inside pole piece 68 so that the spring encircles handlebar 22 in the bracket counterbore 66a. Spring 72 has opposite ends 72a, located on opposite sides of the spring, i.e., 180° apart when the spring is unstressed. Bracket 64 has a pair of spaced-apart parallel slits 73. Pole piece 68 is provided with a similar pair of parallel slits 74. These slits occupy a selected sector of the bracket and inner pole piece, the illustrated slits 73, 74 extending about 60° around the axis of that pole piece. When installing the spring 72 within the inner pole piece 68, the spring is wound up or pretensioned such that the spring ends 72a extend through slits 74 and are captured at the opposite ends of their respective slits 74; see FIG. 4. In other words, one spring end 72a is biased to one end of its slit 74 while the opposite end 72a of the spring is urged to the opposite end of the other slit 74. As a safety feature, the throttle assembly is purposely designed so that the spring ends 72a cannot possibly become disengaged once the unit is installed on the vehicle's handlebars 22. Once the spring is installed in the inner pole piece, that pole piece is inserted into the bracket 64. Preferably, as shown in FIG. 5, a lengthwise slot 73a extends in from the right hand end of the bracket and intercepts slits 73. This allows the spring ends 72a protruding radially from pole piece 68 to be inserted into slits 73 without permanently overstressing and deforming spring 72.

As best seen in FIGS. 2 to 5, the outside cylindrical surface of sensor bracket 64 is formed with an axial recess 75 for accepting a circuit card 76 inserted into the recess through a hole 75a in the bracket flange 64a; see FIG. 5. Mounted to card 76 is a Hall Effect sensor 77, a suitable sensor being available from Honeywell Co., identified by Part No. 5594A2. As shown in FIG. 5, card 76 is mounted to an annular printed circuit board 78 recessed into the end of bracket flange 64a. The electrical leads from sensor 77 are connected via card 76 and board 78 to conductors in cable 53b leading to controller 50 (FIG. 1). Also, a lamp (LED) 80 is mounted to circuit board 78 for reasons that will become apparent.

Figure 3:
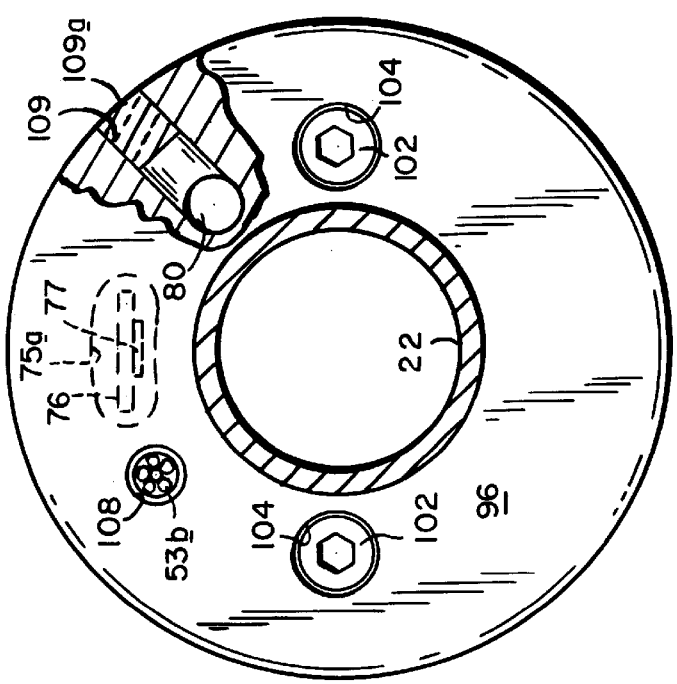
FIG. 3 is an end view with parts broken away thereof.

Referring to FIGS. 2 to 4, a sleeve-like throttle grip 86 encircles bearing element 62 and bracket 64. Throttle grip 86 has a relatively small diameter exteriorly knurled neck 86a which is press fitted onto bearing element 62, capturing the flange 62a of that element. The opposite end segment 86b of grip 86 has a larger diameter so that it can snugly engage around the bracket flange 64a. As best seen in FIGS. 2 and 5, the outside end corner of bracket flange 64a is formed with a groove 88 and the interior wall of grip segment 86b is similarly grooved at 92 for seating a circular array of ball bearings 94. The ball bearings 94 are held in place by an annular end cap 96 which snugly encircles handlebar 22. The inner end of end cap 96 is also formed with a groove 98 which matches the grooves 88 and 92 so that when the end cap is properly seated, the aforesaid grooves form a continuous circular race for the ball bearings 94.

Preferably, as shown in FIGS. 2 and 5, a ball bearing-size notch 100 is formed on the end of bracket 64 adjacent ball groove 88 therein. This allows for the preloading of balls 94 into the groove 88 of the partially assembled unit; i.e., after bracket 64 is seated in grip 86. Inserting the printed circuit board 78 and seating the end cap 96 fully captures the balls 94. End cap 96 is secured in place by two threaded fasteners 102 which extend through lengthwise countersunk holes 104 in the end cap (FIG. 3), through registering holes 105 in circuit board 78 (FIG. 5) and are screwed into threaded passages 106 in the bracket flange 64a (FIG. 5). As best seen in FIGS. 2 and 3, a lengthwise passage 108 is provided in the end cap 96 to accommodate the cable 53b that is connected to circuit board 78 as described above. Also, a radial passage 109 is present in end cap 96 which extends to lamp 80 allowing light from the lamp to be seen through a transparent side window 90a in end cap 96. Alternatively, the entire end cap may be made of a transparent plastic material. In any event, when the lamp 80 is turned on, light is emitted from the end cap 96 which can readily be seen by the bicycle rider.

Preferably, also, a notch 110 is formed at the inner edge of end cap 96 for seating an O-ring 112. Thus, when the threaded fasteners 102 are tightened down, the O-ring 112 is compressed so that it tightly engages handlebar 22 thereby preventing end cap 96 and bracket 64 from moving relative to the handlebar 22. Grip 86 and its press-fitted bearing element 62 are captured axially but allowed to rotate via ball bearings 94.

Referring now to FIGS. 2 and 4, positioned within the inner end of the enlarged segment 86b of throttle grip 86 concentric to inner pole piece 68 is a magnet assembly shown generally at 116. That assembly fits in the annular space between grip segment 86b and bracket 64 radially out from Hall Effect sensor 77. Magnet assembly 116 consists of an outer pole piece 118 in the form of a ring of ferromagnetic material such as No. 1018 CRS. Pole piece 118 is provided with a pair of spaced, parallel slits 122 aligned with the slits 74 in the inner pole piece 68. The illustrated slits 122 occupy a 60° sector of pole piece 118; however, they, along with slits 74, could be longer; e.g. 85°–90°. As shown in FIGS. 2 and 4, the opposite ends 72a of spring 72 extend out radially through slits 122. Since these slits occupy the same sector as slits 74, the two spring ends repose at the opposite ends of their respective slits 122.

The magnet assembly 116 also includes a two-pole split ring magnet 124 which is bonded or adhered to the inside surface of pole piece 118. The magnet is preferably of barium ferrite and is diametrically polarized as shown in FIG. 4. As best seen in that figure, the magnet 124 extends all around the interior of pole piece 118 except at the location of the slits 122 therein, that sector of the pole piece being somewhat thicker. In other words, there is a gap in the magnet and the spring ends 72a extend through that gap into the slits 122 in the outer pole piece 118.

As shown in FIG. 2, the magnet assembly 116 is fixed to rotate with the throttle grip 86 by a fastener 128 which extends through a radial hole 132 in the throttle grip segment 86b into a registering threaded hole 134 in the outer pole piece 118.

It will be appreciated from the foregoing description that the pre-assembled bracket 64 with the inner pole piece 68, torsion spring 72 and Hall Effect sensor 77 attached thereto, and end cap 96 are all fixed to handle bar 22 and constitute the stationary components of the control 54. On the other hand, the throttle grip 86, bearing element 62 and magnet assembly 116 connected thereto by fastener 128 can be rotated relative to those stationary components by turning the knurled neck 86a of throttle grip 86.

As noted above, the magnet 124 is diametrically magnetized with parallel field lines L as shown in FIG. 4. Also, due to the fact that the spring 72 is pre-loaded as noted above, the throttle grip 86 and magnet assembly 116 fixed to rotate therewith are strongly biased to a "home" position shown in that figure. In this home position, the Hall Effect sensor 77 is located more or less midway between the north (N) and south (S) poles of magnet 124 as shown in FIGS. 2 and 4. By its inherent nature, the Hall Effect sensor 77 sees only magnetic flux perpendicular to its face. In this home position, then, the sensor 78 sees essentially no perpendicular magnetic flux from magnet 124 and produces no output signal. Also, securely shielded by the concentric inner and outer pole pieces 68 and 188, the Hall Effect sensor 77 sees no stray fields, making its output unusually and uniquely highly reliable and consistently repeatable.

However, when the throttle grip 86 is turned in one direction from the home position, i.e., counterclockwise as shown in FIG. 4, the south pole of magnet 124 is moved progressively under sensor 77. The flux field from that pole causes the sensor to produce a corresponding proportional sensor voltage which is fed via cable 53b to controller 50. As we shall see, this signal causes the controller 50 to drive the motorized hub assembly 44 so as to accelerate the FIG. 1 bicycle. On the other hand, when the throttle grip 86 is rotated in the opposite direction from its home position, i.e., clockwise in FIG. 4, the north pole of magnet 124 is rotated progressively under sensor 77 so that the sensor is subjected progressively to an opposite flux field from that pole. The sensor thereupon delivers a proportional voltage of the opposite sign to controller 50 causing the controller to apply a braking voltage to hub assembly 44 resulting in the bicycle being slowed or brought to a stop. No matter which way the throttle grip 86 is rotated, when the operator releases grip 86, the grip returns to its home position so that no signal is applied by control 54 to controller 50. Preferably, that controller is programmed to allow the bicycle to coast in that event. In other words, magnet 124 has a natural null point for the off position between the concentric inner (68) and outer (118) pole pieces.

The concentric pole pieces also capture the return flux field from magnet 124 so as to achieve the maximum signal effect on sensor 77 with minimum magnetic flux "noise" on the sensor from either external magnetic influences or from the magnet's own return flux field.

It should be appreciated from the foregoing that the described construction of control 54 minimizes the stresses on spring 72. More particularly, when the grip 86 is turned in opposite directions to accelerate and brake the bike, the spring is always wound up. In other words, when grip 86 is turned clockwise in FIG. 4, the visible end 72a of the spring is turned clockwise with the grip (and the attached outer pole piece 118). The other spring end (not shown) is captured by the end of its slit 74 in the stationary inner pole piece 68. Of course, the visible spring end 72a is free to slide along its slit in the inner pole piece. On the other hand, when the grip 86 is turned counterclockwise, the visible spring end 72a is captured by the end of its slit 74 in the stationary inner pole piece while the spring end not shown moves counterclockwise with the grip, while sliding along its slit 74 in the inner pole piece. Thus, spring 72 constitutes a 2-way self-centering torsion spring. At no time is the spring 72 unwound from its prestressed position shown in FIG. 4 as would shorter the useful life of the spring.

The illustrated control 54 has a throttle grip 86 with 60° travel from its home position in each of the forward and reverse directions which corresponds to the arcuate lengths of the slits in the inner and outer pole pieces. In some applications, one may wish to achieve higher speed resolution. This can be accomplished by either 1) increasing the grip's travel angle from ±60° to up to about ±85° or 2) simply making control 54 larger and increasing the arcuate length of the pole piece slits, or doing both.

Also, while control 54 is specifically shown with a hand grip for controlling a bicycle, it should be obvious that the control may be equipped with a foot pedal or a "joy stick" to control any vehicle or, more generally, used to provide variable positive and negative signals with a secure "off" position to control any electrical load.

Figure 6:
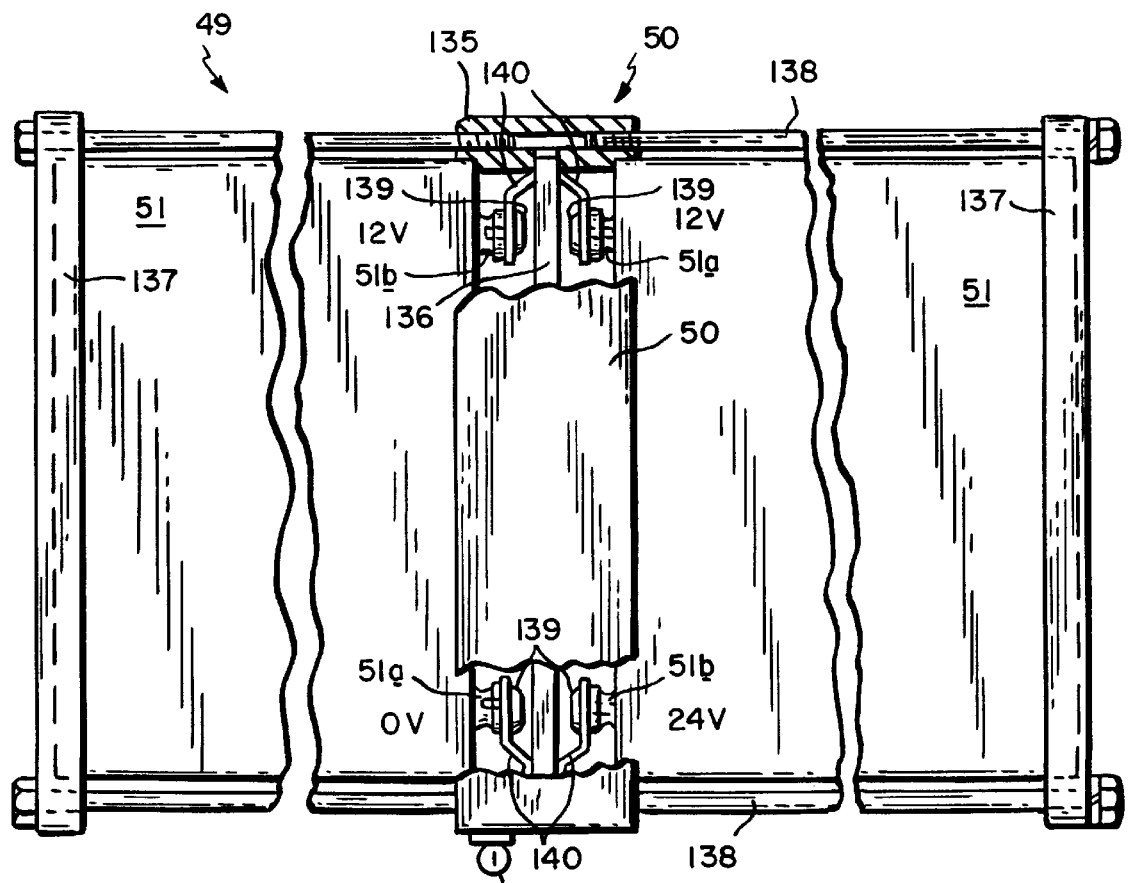
FIG. 6 is a plan view with parts broken away showing the power unit of the control system in FIG. 1.

Refer now to FIG. 6 which shows the power unit 49 in FIG. 1 in greater detail. As seen there, the controller 50 of unit 49 comprises a housing 135 containing a control circuit on a printed circuit board 136. The housing is clamped between the pair of rechargeable batteries 51 by opposed end plates 137 secured to opposite sides of housing 135 by bolts 138 threaded into opposite sides of the housing. Suitable batteries are 12 volt, 16 amp.-hour batteries available from Hawker Energy Co. Each battery 51 has a negative terminal 51a and a positive terminal 51b. These terminals are in the form of receptacles for receiving male terminals or plugs 139 at the ends of flexible circuits or harnesses 140 leading from the printed circuit board 136 in housing 135.

The two batteries 51 are connected in series so that 12 volts are present in the two upper plugs 139 in FIG. 6 and 24 volts are available on the lower right hand plug 139 in that figure. Preferably, a push button or a key switch 142 is provided on controller housing 135 to turn the power unit 49 on and off to conserve the batteries.

Controller 50, or more particularly the circuit board 136 therein, receives control signals from the hub assembly 44, throttle/brake control 54 and pedal sensor 56 via cables 53a, 53b and 53c, respectively. Cable 53a typically has 5 wires, three of which pass through a connector plug 53aa (FIG. 1) and continue onto hub assembly 44. The other two wires are the input to power unit 49 for battery recharging from a recharger 170 mounted to seat post 28 (FIG. 1). The battery charger's plug selectively uses only the wires necessary for that recharging function. In other words, plug 53aa is either connected to hub assembly 44 or to the recharger 170 so that the motor 44a cannot possibly operate during recharging.

In response to the aforesaid control signals, the controller supplies the necessary voltages to the motorized hub assembly 44 to accelerate or decelerate the bicycle and to the lamp 80 (FIG. 2) so that the lamp provides certain indications to be described presently. The sandwiching of the controller 50 between the two batteries 51 as described above has several advantages. First, it produces a very compact power unit 49 which can fit easily on a more or less standard bicycle rack overlying the rear wheel of the bicycle. Also, mounting the controller 50 directly between the batteries avoids the need to provide a large, expensive capacitor on circuit board 136. In other words, the two opposed batteries 51 provide the requisite capacitance for that circuit. Finally, the illustrated unit 49 allows easy removal and replacement of the batteries 51 (and controller 50) when needed.

Figure 7:
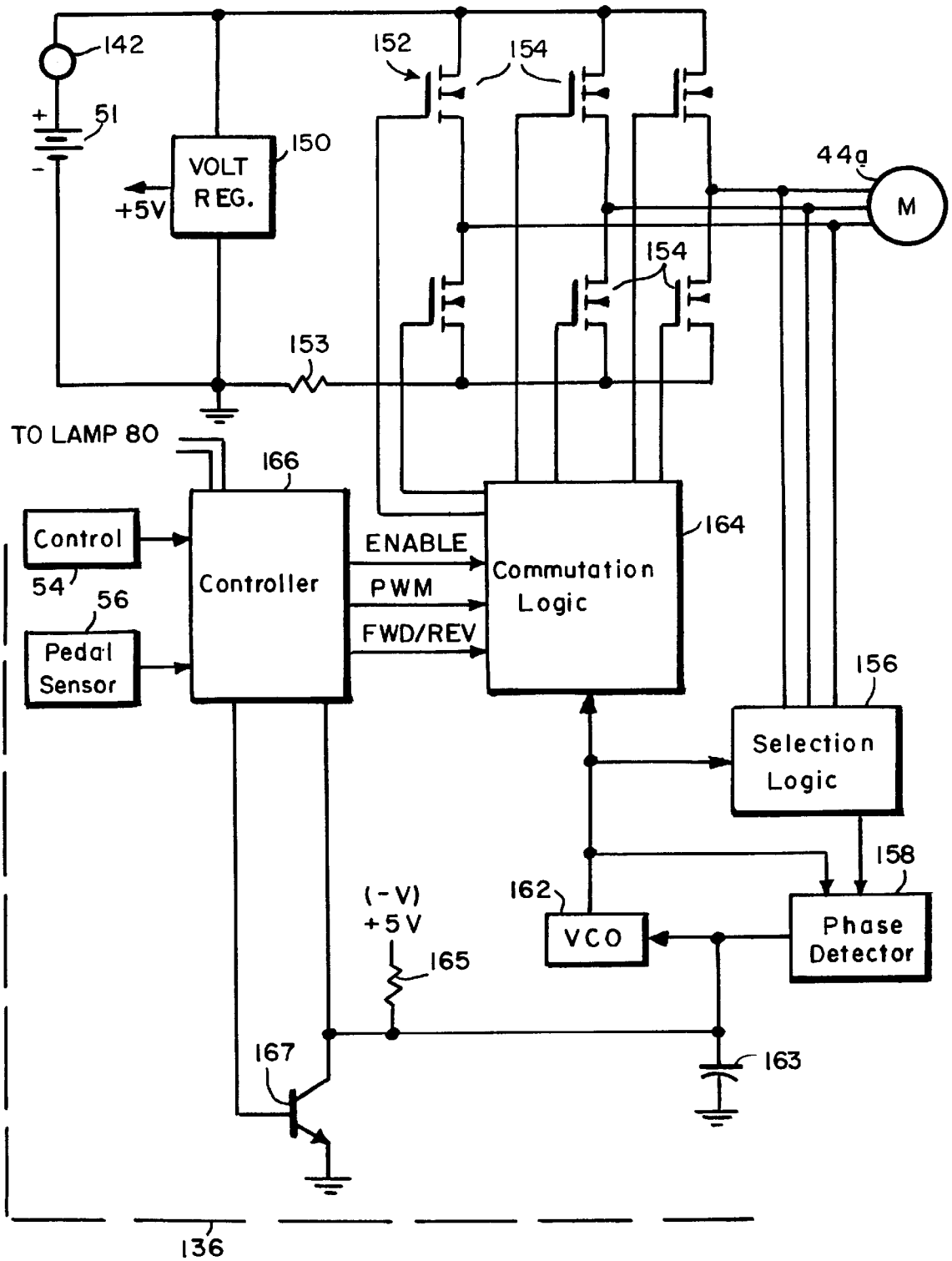
FIG. 7 is a block diagram of the controller in the FIG. 6 power unit.

Referring now to FIG. 7, the control circuit on circuit board 136 is a modified back EMF controller. The voltage from batteries 51, regulated by a voltage regulator 150, is applied to the three-phase brushless motor 44a in the motorized hub assembly 44 through a three-phase bridge 152 composed of power field effect transistors (FETs) 154. The motor current is present in a resistor 153 in the bridge ground circuit.

The motor 44a voltage is sampled at each of the three motor leads by selection logic 156. The purpose of the selection logic is to select the motor lead whose voltage corresponds to the phase that is not energized and to feed that to a phase detector 158. The output of the phase detector is applied as a control voltage to a voltage controlled oscillator (VCO) 162, the output of which is fed back to the phase detector 158, thereby forming a phase locked loop. The control voltage from the phase detector is also applied to a capacitor 163 connected to ground. Also, a +5V voltage from voltage regulator 150 is applied to that capacitor via a resistor 165. The voltage on the capacitor is used to control a reset transistor 167 whose conduction to ground is controlled by microcontroller 166. The output of the VCO 162 is fed to commutation logic 164 to steer ENABLE, PMW and FWD/REV signals from a micro-controller 166, via logic 164, to the three-phase bridge 152. The throttle/brake control 54 and pedal sensor 56 supply inputs to microcontroller 166.

When the bicycle shown in FIG. 1 is at rest, there is no back EMF from motor 44a and hence no signal from the selection logic 156 to the phase detector 158. Resultantly, the VCO 162 control voltage on capacitor 163 is allowed to charge through resistor 165. When the voltage on the capacitor 163 reaches a maximum, as determined by the microcontroller 166, the reset transistor 167 is turned on thereby discharging that capacitor. This has the effect of continuously ramping the VCO 162 control voltage and hence the VCO frequency between zero and a maximum value. Under these circumstances then, the VCO is sweeping its frequency range in preparation for a back EMF signal from motor 44a to lock on to.

When the rider begins to pedal the bicycle, the motor 44a begins to turn, producing a back EMF through the selection logic 156 to the phase detector 158. When the output of the VCO 162, which is sweeping from zero to maximum frequency as described above, is close in frequency to the back EMF, the VCO 162 and phase detector 158 will achieve a phase lock, preventing the voltage on capacitor 163 from reaching a maximum voltage. The microcontroller 166 detects this failure to achieve maximum voltage as an indication of phase lock.

In the meantime, microcontroller 166 is monitoring the state of the pedal sensor 56. When continuous motion of the pedal is detected (equivalent to bike motion of 1–2 MPH), the microcontroller 166 measures the input signal from the throttle/brake control 54. If that signal is greater than one-half the maximum value (which corresponds to the throttle "home" position), the microcontroller 166 calculates the throttle setting as follows:

Throttle setting=throttle reading–(one-half*maximum value)

and enables the commutation logic 164. The PWM signal from logic 164 to microcontroller 166 is then increased thereby increasing the motor terminal voltage on the pair of windings in motor 44a that would produce positive torque on the motor rotor. The motor current is sensed through the resistor 153 and increases until it is equal to K*Vt where Vt is the measured calculated throttle setting of throttle/brake control 54. The positive torque from the motor 44a thereupon propels the bicycle forward to assist the rider.

If the input signal from throttle/brake control unit 54 is less than one-half the maximum value (or the throttle "home" position value), the microcontroller 166 goes into a regeneration mode. For this, the microcontroller issues an ENABLE signal to logic 164, the PWM signal from microcontroller is set to a fixed value and the FWD/REV signal therefrom is placed into reverse such that the commutation logic 164 is enabled for a fixed period of time. This allows current to build up in motor 44a in a direction to produce negative torque due to the back EMF. The commutation logic 164 is then disabled after the fixed period, allowing the motor current to return to batteries 51. The microcontroller 166 thereupon keeps the commutation logic 164 disabled for a period proportional to:

Period=K2*((½ maximum throttle value)–throttle reading).

before initiating another cycle. The negative torque thus produced retards motion of the bicycle.

An alternative technique for detecting VCO phase lock and hence motion of the motor 94a is obtained by returning resistor 165 to a negative voltage (–V) as shown in parenthesis in FIG. 7. Thus at rest, the VCO control on capacitor 163 is maintained at or near zero and the transistor 167 remains cut off.

When the rider begins to pedal, the motor 44a begins to turn, producing a back EMF through the selection logic 156 to the phase detector 158. This causes the control voltage on capacitor 163 to increase, establishing phase lock. The microcontroller 166 measures the voltage on capacitor 163. When this voltage exceeds a minimum threshold, the controller program assumes the bicycle rear wheel is turning and the VCO 162 is locked. The commutation logic is then enabled and the microcontroller 166 operates as described above.

The microcontroller 166 program is attached hereto as Appendix A.

Pedal Sensing

In some jurisdictions to avoid classification as a motorcycle, it may be required to prevent power from being delivered to the rear wheel until the rider begins to pedal and to continue power only if the rider continues to pedal. In other words, in this event, motor 44a has to provide a back EMF which is only present when the bike is moving combined with verification that the rider is pedaling before the controller can successfully power the motor. The lines in the Appendix A program marked REFERENCE 1 achieve this. As discussed above, the pedal sensor 56 changes state whenever a sprocket tooth passes near it. A software counter in controller 166 is incremented on every transition of the pedal sensor. Meanwhile, a software timer counts down between transitions. When the software timer times out, the software counter is cleared. Thus, as long as the user continues to pedal the bicycle, the software counter will contain some number other than zero. The rest of the program in Appendix A uses this information to apply power to the motor 44*a*.

Low Battery Current Limit

When the batteries 51 are partially discharged, it may be desirable to limit the motor current and thus increase the time left for operating the motor 44*a* allowing the user to "limp" home under reduced power. The lines in the Appendix A program marked REFERENCE 2 implement this function. When the batteries are below MIN_BAT, the setpoint is divided by 2 effectively limiting the motor current to 5 to 8 amps.

Cruise Control

A cruise control can be implemented by interpreting the throttle setpoint as a speed setpoint rather than a torque command. The lines in the Appendix A program marked REFERENCE 3 perform this function by comparing the setpoint with the VCO 162 output, which is a representation of vehicle speed.

Top Speed Limit

A bicycle has a top safe speed that may be set by the local jurisdiction. If the speed exceeds this limit, power to the motor 44*a* is inhibited. Depending on terrain, the bicycle may still go faster than the limit, but the rider cannot apply power from the motor beyond this maximum speed. The lines in the Appendix A program marked REFERENCE 4 implement this function. If the maximum speed is exceeded, the Enable signals are brought low and the VCO lock is turned off. In order to resume applying power to the motor, the VCO 162 must again become locked as described above, which would require the speed to fall below the maximum level.

Power Limit

In some jurisdictions, it may be necessary to limit the power to the motor 44*a*. The lines in the Appendix A program marked REFERENCE 5 performs this function. If the current exceeds a maximum level, the control is reduced to maintain current to motor 44*a* at or below the limit.

For certain applications such as a wheelchair or golf cart, it may be desirable to power the vehicle up from zero speed without pedaling or pushing. In these applications, the controller 50 may incorporate a conventional step motor circuit to start motor 44*a* when the vehicle is stationary. Then, when the motor produces a selected back EMF (corresponding to say, 3–5 MPH), the controller 166 may switch over to normal operation as described above. Also, three Hall Effect sensors or optical encoders may be incorporated right into motor 44*a* to sense the position of the motor rotor as a substitute for the back EMF signals described above. This may achieve more precise control of the motor.

Preferably, the microcontroller 166 controls a lamp 80 (FIGS. 2 and 3) so that the lamp emits various signals. For example, the lamp may blink at a selected first rate when the bicycle rear wheel 42 is turning at about 1–2 MPH. This signals the bicycle rider that he may turn the throttle grip 86 so that motor 44*a* begins to power the bicycle. The microcontroller 166 may also be programmed to control lamp 80 so that it blinks at a different rate when the batteries 51 need to be recharged.

It will thus be seen that the objects set forth above, among those made apparent from the preceding description are efficiently attained. Also, certain changes may be made in the above construction without departing from the scope of the invention. For example, as shown in phantom in FIG. 2, a spring-loaded ball 177 may be incorporated into end cap 86 which can seat in a series of recesses 179 formed in the adjacent end of throttle grip 86 to register discrete positive and negative signal positions and the home position of the throttle grip. Therefore, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A contactless electronic control system comprising an inner pole piece and an outer pole piece, said inner and outer pole pieces being concentric and rotatable relatively about a common axis through a range of relative angular positions in either direction from a home position;
   a generally circular magnet having north and south poles on opposite sides of the magnet being fixed to one of said inner and outer pole pieces;
   a Hall Effect sensor position radially at a selected location between said magnet and the other of said inner and outer pole pieces so that when said inner and outer pole pieces are rotated relatively in one direction so as to move one of said north and south poles away from the home position and towards said sensor, said sensor produces continuously variable proportional positive electrical signals and when the inner and outer pole pieces are rotated relatively in the opposite direction so as to move the other of said north and south poles away from the home position and towards the sensor, said sensor produces continuously variable proportional negative electrical signals, and means for establishing said home position.

2. A contactless electronic control system comprising an inner pole piece and an outer pole piece, said inner and outer pole pieces being concentric and rotatable relatively about a common axis through a range of relative angular positions;
   a circular magnet having north and south poles on opposite sides of the magnet, said magnet being fixed to one of said inner and outer pole pieces;
   a Hall Effect sensor position radially at a selected location between said magnet and the other of said inner and outer pole pieces so that when said inner and outer pole pieces are rotated relatively in one direction so as to move one of said north and south poles towards said sensor, said sensor produces continuously variable proportional positive electrical signals and when the inner and outer pole pieces are rotated relatively in the opposite direction so as to move the other of said north and south poles towards the sensor, said sensor produces continuously variable proportional negative electrical signals, and
   biasing means biasing said inner and outer pole pieces relatively to a home position which locates said north and south poles circumferentially on opposite sides of said sensor.

3. The control system defined in claim 2 wherein said sensor is substantially midway between said north and south poles when the inner and outer pole pieces are in said home position.

4. The control system defined in claim 2
   wherein the magnet is fixed to rotate with the outer pole piece, and
   further including means for fixing the inner pole piece at a selected angular position.

5. The control system defined in claim 4 wherein the biasing means comprise a coil spring having opposite ends and fitted coaxially within the inner pole piece.

6. The control system defined in claim 5
further including a first pair of concentric slits in said inner and outer pole pieces, a second pair of concentric slits in said inner and outer pole pieces, said second pair of slits being parallel to said first pair of slits and all of said slits defining the same included angle about said axis, and wherein said ends of the spring lie on opposite sides of the spring when the spring is in its natural, unstressed position, but when said spring is wound up and positioned in said inner pole piece, one end of the spring projects through the first pair of slits and the other end of the spring projects through the second pair of slits so that the spring assumes a normal stressed condition wherein the ends of the spring repose at opposite ends of their respective pairs of slits and are angularly spaced apart by said same included angle.

7. The control system defined in claim 6 wherein the magnet is a split ring magnet.

8. The control system defined in claim 2 and further including detent means registering discrete relative angular positions of said inner and outer pole pieces within said range of relative angular positions.

9. The control system defined in claim 2 wherein the magnet is diametrically magnetized.

10. The control system defined in claim 2 and further including
a current source;
a brushless motor, having a plurality of windings and a rotor, and
a control circuit responsive to said electrical signals for delivering current from said current source to said motor windings, the magnitude of the current being dependent upon the relative angular position of said inner and outer pole pieces.

11. The control system defined in claim 10 and including means in said control circuit for inhibiting the delivery of current to the motor windings unless the motor rotor is turning at a selected minimum rate.

12. The control system defined in claim 11 wherein the inhibiting means include means for detecting back EMF signals on the motor windings.

13. The control system defined in claim 10 wherein the current source is a battery.

14. A contactless electronic control system comprising
a tubular bracket having two ends;
a tubular grip member having two ends and encircling the bracket around a common axis therewith;
a rotary connection between the grip member and the bracket so that the grip member can rotate relative to the bracket about said axis through a range of relative angular positions on either side of a home position;
a ring magnet having diametrically opposite poles and being mounted inside the grip member for rotation therewith about said axis;
an electrical device mounted in said bracket opposite the magnet, said device producing a continuously variable electrical signal whose value depends upon the relative angular position of said magnet and said device, said signal being positive when the grip member is rotated to one side of the home position and negative when the grip member is rotated to the other side of the home position, and
means for establishing a home position of the grip member which locates the electrical device between the magnet poles.

15. The control system defined in claim 14 wherein the electrical device is a Hall Effect device.

16. The control system defined in claim 15 and further including
a current source;
a brushless motor having a plurality of windings and a rotor, and
a control circuit responsive to said electrical signals for delivering drive current from said current source to said motor windings, the magnitude of the current being dependent upon the relative angular position of the grip member and the bracket.

17. The control system defined in claim 16 wherein
the current source comprises a pair of opposed batteries, and
the control circuit is positioned between and connected to the batteries so that the batteries add capacitance to the control circuit.

18. The control system defined in claim 17 and further including
a battery charger, and
means for connecting the pair of batteries to the battery charger.

19. The control system defined in claim 17 and further including a key switch in circuit between the pair of batteries and the control circuit.

20. The control system defined in claim 14 and further including
an annular inner pole piece concentrically positioned in the bracket.

21. The control system defined in claim 20 and further including an annular outer pole piece concentrically positioned in the grip member, said magnet being located between said pole pieces.

22. A contactless electronic control system comprising
a tubular bracket having two ends;
a tubular grip member having two ends and encircling the bracket around a common axis therewith;
a rotary connection between the grip member and the bracket so that the grip member can rotate relative to the bracket about said axis through a range of relative angular positions, said rotary connection including a bearing between one end of the bracket and one end of the grip member; an end cap engaging the other end of the grip member and defining therewith and with the other end of the bracket a ball bearing track, and a circular array of ball bearings in said track;
a ring magnet having diametrically opposite poles and being mounted inside the grip member for rotation therewith about said axis, and
an electrical device mounted in said bracket opposite the magnet, said electrical device producing an electrical signal whose value depends upon the relative angular position of said magnet and said device.

23. The control system defined in claim 22 and further including means in said other end of the bracket for providing ball bearing access to said track.

24. The control system defined in claim 22 and further including
a lamp fixed to said bracket, and
means in the end cap for providing visual access to the lamp.

25. The control system defined in claim 24 wherein
the lamp and the electrical device are connected to a circuit board mounted to said bracket, and said visual access means comprises a window in the end cap opposite the lamp.

26. A contactless electronic control system comprising a tubular bracket having two ends;

a tubular grip member having two ends and encircling the bracket around a common axis therewith;

a rotary connection between the grip member and the bracket so that the grip member can rotate relative to the bracket about said axis through a range of relative angular positions;

a ring magnet having diametrically opposite poles and being mounted inside the grip member for rotation therewith about said axis;

an electrical device mounted in said bracket opposite the magnet, said device producing an electrical signal whose value depends upon the relative angular position of said magnet and said device;

an annular inner pole piece concentrically positioned in the bracket;

an annular outer pole piece concentrically positioned in the grip member, said magnet being located between said inner and outer pole pieces, and biasing means for biasing the grip member and the bracket relatively to a home position which locates at electrical device substantially midway between the magnet poles.

27. The control system defined in claim 26 wherein the biasing means comprise a coil spring positioned concentrically within the inner pole piece, said spring having opposite ends which extend through a pair of parallel registering arcuate slits in the bracket and pole pieces so that when the grip member is rotated from said home position in either direction, the spring winds up and urges the grip member back to said home position.

28. The control system defined in claim 27 and further including detent means for denoting selected angular positions of the grip member relative to the bracket.

* * * * *